Jan. 31, 1956 W. W. SCANLON 2,733,390

GERMANIUM RECTIFIER FOR LARGE CURRENTS

Filed June 25, 1952 2 Sheets-Sheet 1

INVENTOR
WAYNE W. SCANLON

BY

G. D. O'Brien
R. M. Hicks
ATTORNEYS

Jan. 31, 1956

W. W. SCANLON 2,733,390

GERMANIUM RECTIFIER FOR LARGE CURRENTS

Filed June 25, 1952

2 Sheets-Sheet 2

INVENTOR
WAYNE W. SCANLON

BY

G. W. O'Brien
R. M. Hicks
ATTORNEYS

United States Patent Office 2,733,390

Patented Jan. 31, 1956

2,733,390

GERMANIUM RECTIFIER FOR LARGE CURRENTS

Wayne W. Scanlon, Silver Spring, Md.

Application June 25, 1952, Serial No. 295,596

7 Claims. (Cl. 317—239)

(Granted under Title 35, U. S. Code (1952), sec. 266)

This invention described herein may be manufactured and used by or for the Government of the United States of America for governmental purposes without the payment of any royalties thereon or therefor.

This invention relates to rectifiers and the like, and more particularly to an improved germanium rectifier or circuit element and a method of making same.

Many types of rectifiers have been utilized in the past including vacuum tubes, mercury and vapor discharge tubes, and selenium or copper oxide rectifiers. Recently germanium crystals have been developed for use as rectifiers and other elements in electronic circuits which have numerous advantages over the rectifiers and elements previously used, since they are small in size and light in weight, have an extremely low power consumption, and require no warm-up period prior to use. However these germanium rectifiers and other circuit elements formed of germanium have required an extensive and elaborate heat treatment, etching and in some cases an anodizing treatment to prepare them for use. Other types of germanium rectifiers have required certain chemical treatment in the preparation thereof, and all of these garmanium elements required a special point contact on one of the electrodes in order to operate satisfactorily. While these rectifiers were advantageously used in many circuits and, when combined with a third electrode of a point contact character, could be utilized in other circuits in which a vacuum tube triode had been conventionally utilized, the germanium crystals were very limited in their field of application by the low current which they could handle satisfactorily due to the point contact relationship.

In accordance with the present invention a germanium rectifier for use with large currents is constructed with comparatively simple manufacturing procedure. A small thin wafer of high purity germanium [5 to 10 ohm-cm.] is used. An effective P-N junction is produced by the diffusion of acceptor or donor impurity atoms into the germanium from opposite faces of the wafer. Indium metal may be used for the acceptor atoms and tin metal may be used for the donor atoms. Both of these metals may be of commercial purity. These metals, which melt at relatively low temperature [in the range of an ordinary soldering iron], "wet" the germanium when used with a suitable flux and at their melting temperatures readily diffuse into the germanium crystal lattice. The germanium wafer therefore becomes hole conducting or P-type in the region adjacent to the acceptor metal and electron conducting or N-type in the region adjacent to the donor metal thus producing a P-N junction.

P-N junctions produced in this way can be used as rectifiers or when made in the form of N-P-N or P-N-P junctions can be used as transistor.

One object of the present invention is to provide an improved germanium rectifier which is simple to construct and is capable of handling large currents.

A further object of the present invention is to provide an improved germanium triode which is simple to construct and may be utilized in many applications where power amplification is desired.

An additional object of this invention resides in the manufacture of a germanium rectifier by fuzing donor metal and acceptor metal to a germanium crystal wafer.

A still further object of the present invention is to provide an improved method of making a germanium rectifier or a triode which may be carried out by using conventional soldering techniques with commonly used fluxes and by relatively unskilled operators.

Other objects and many of the attendant advantages of this invention will be readily appreciated as the same becomes better understood by reference to the following detailed description when considered in connection with the accompanying drawings wherein.

Figures 1, 2, 3, 4:
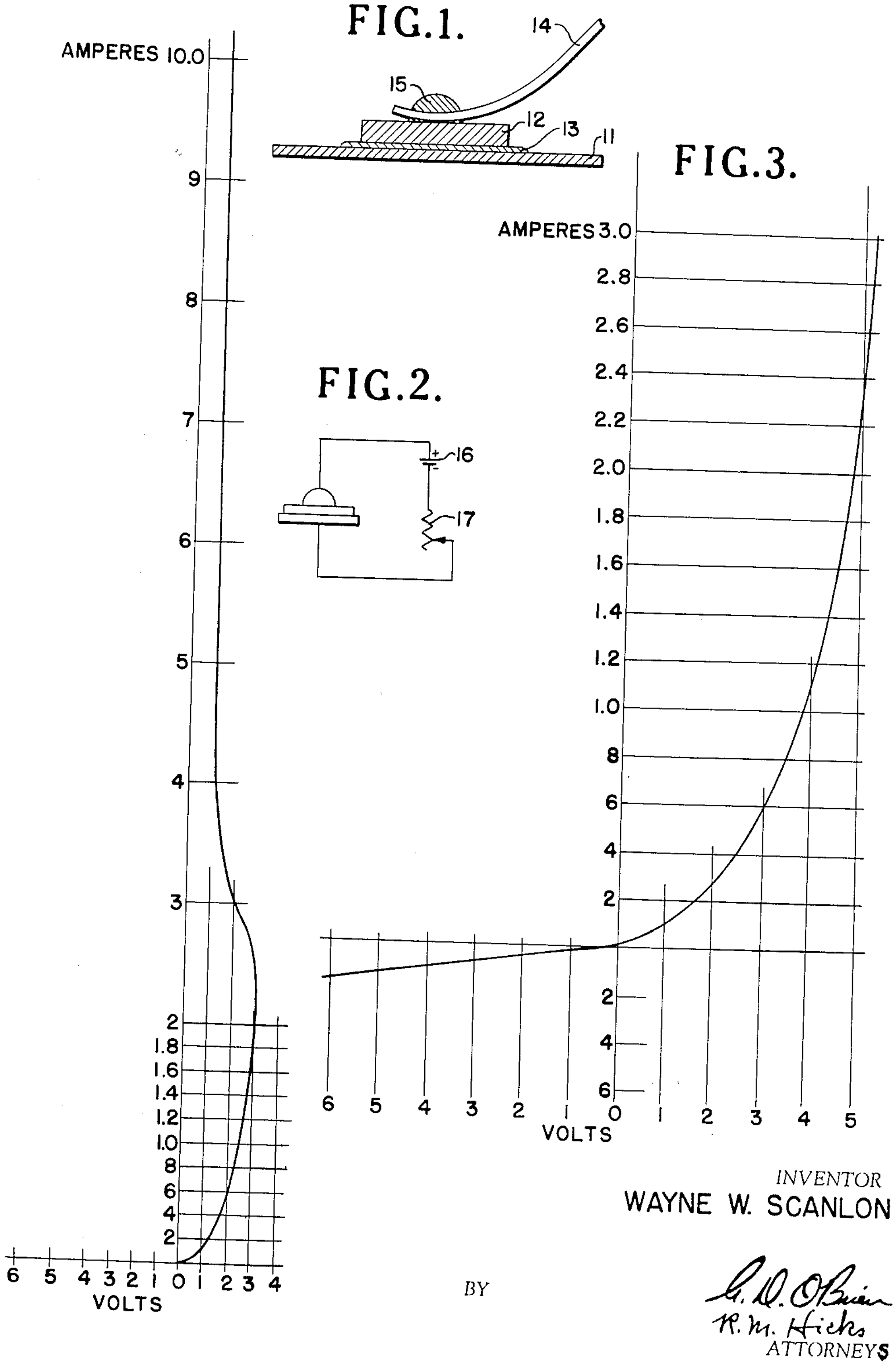
Fig. 1 is a longitudinal sectional view on an enlarged scale of a rectifier constituting one preferred embodiment of the present invention.
Fig. 2 is a circuit diagram illustrating a test arrangement of the rectifier of Fig. 1 and indicating the direction of easy current flow.
Fig. 3 is a graph illustrating the current in amperes produced by applied voltages in opposite directions through the rectifier of Fig. 1.
Fig. 4 is a graph illustrating the current in amperes resulting from voltages applied in opposite directions to a rectifier similar to that shown in Fig. 1 and indicating negative resistance characteristics.

Referring now to the drawings in detail the rectifier of Fig. 1 is illustrated on a greatly enlarged scale and preferably consists of an electrode 11 which is fused to a relatively thin garmanium wafer 12 with tin 13. A second electrode 14 is fused to the opposite surface of the germanium wafer 12 with indium 15. Conventional soldering irons may be utilized in the above operations, care being taken to avoid mixing of the tin and indium metals. A conventional flux is used to assist in "wetting" of the germanium and the electrodes by the tin or indium metals. This constitutes the simplest and preferred form of the present invention. If desired, the fusion may be accomplished in a vacuum furnace or in an inert atmosphere in order to eliminate the need for a solder flux. However, satisfactory results can be obtained by the ordinary solder techniques in air and is obviously the simpler and more economical method. The size of the germanium wafer is usually of the order of 1 sq. millimeter in area and 0.5 millimeter in thickness. The electrode 11 is preferably made substantially larger than the germanium wafer to facilitate cooling, and, if desired, the electrode 14 may also be constructed in the form of a relatively large plate to further increase the cooling area. Using the above construction and immersing the device in water for cooling purposes extremely high current densities can be obtained in the order of 300 amperes per sq. centimeter at 5 volts.

While the preferred form of the present invention uses indium and tin metals to provide the necessary donor and acceptor elements in germanium, other metals could be used for this purpose.

As an example a solder containing a high percentage of aluminum may be used in place of indium if desired.

The theories relating to rectification in a semi-conductor such as germanium, are found in standard text literature of the art and explanation thereof is not herein repeated.

The resulting flow of current through a rectifier such as that illustrated in Fig. 1 is indicated in the graph of Fig. 3 using a circuit such as that shown in Fig. 2, whereby with the connections to the battery 16 as shown, the current may be varied by varying the potential on the battery 16 through a variable resistance 17 to vary the voltage applied to the germanium rectifier. The connections shown in Fig. 2 are in the direction of easy current flow and the test results when plotted will produce the upper right hand curve shown in Fig. 3. By reversing the connections to the battery 16 the lower left hand portion of the curve in Fig. 3 is obtained which indicates a small amount of current passed in the reverse direction. The graph of Fig. 4 is also obtained with a circuit such as that in Fig. 2 and using a similar construction of rectifier, but the upper right hand portion of the curve indicates a negative resistance characteristic beyond about 3 volts in the direction of easy current flow.

Both of these curves have been illustrated to indicate the different characteristics which may be obtained with a construction in accordance with the present invention.

Figure 5:
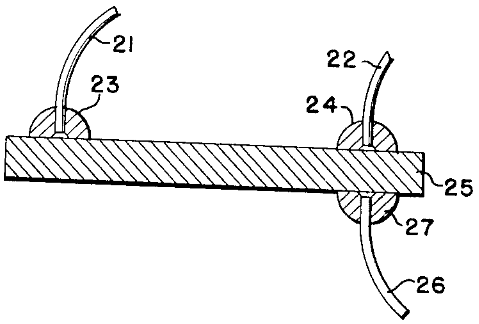
Fig. 5 is a sectional view on an enlarged scale illustrating a germanium triode constructed in accordance with another preferred form of the present invention.

The triode illustrated in Fig. 5 consists of two electrodes 21 and 22 which are attached by small areas of indium metal 23 and 24 to one surface of the germanium wafer 25. A third lead 26 is attached by a spot of tin metal 27 to the opposite face of the germanium wafer 25. Here again the indium metal diffuses into the germanium wafer and causes P-type conduction in the adjacent areas and the tin metal 27 diffuses into the opposite portion of the germanium wafer and causes N-type conduction in the adjacent area.

Figure 6:
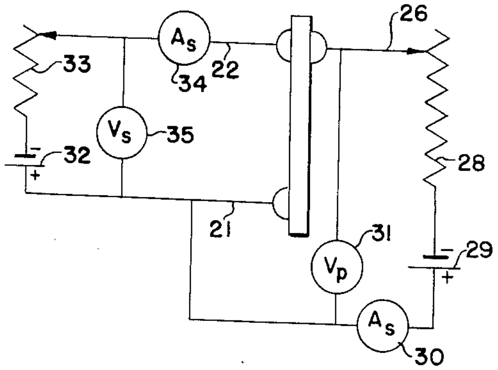
Fig. 6 is a circuit diagram illustrating a test circuit for use with the germanium triode of Fig. 5.

The triode of Fig. 5 may be connected in a circuit as indicated in Fig. 6 with the lead 26 connected to a variable resistance 28 and through a battery 29 and an ammeter 30 to the lead 21. A voltmeter 31 is connected across the variable resistor 28 and battery 29 to indicate the potential applied in the primary circuit.

Figure 7:
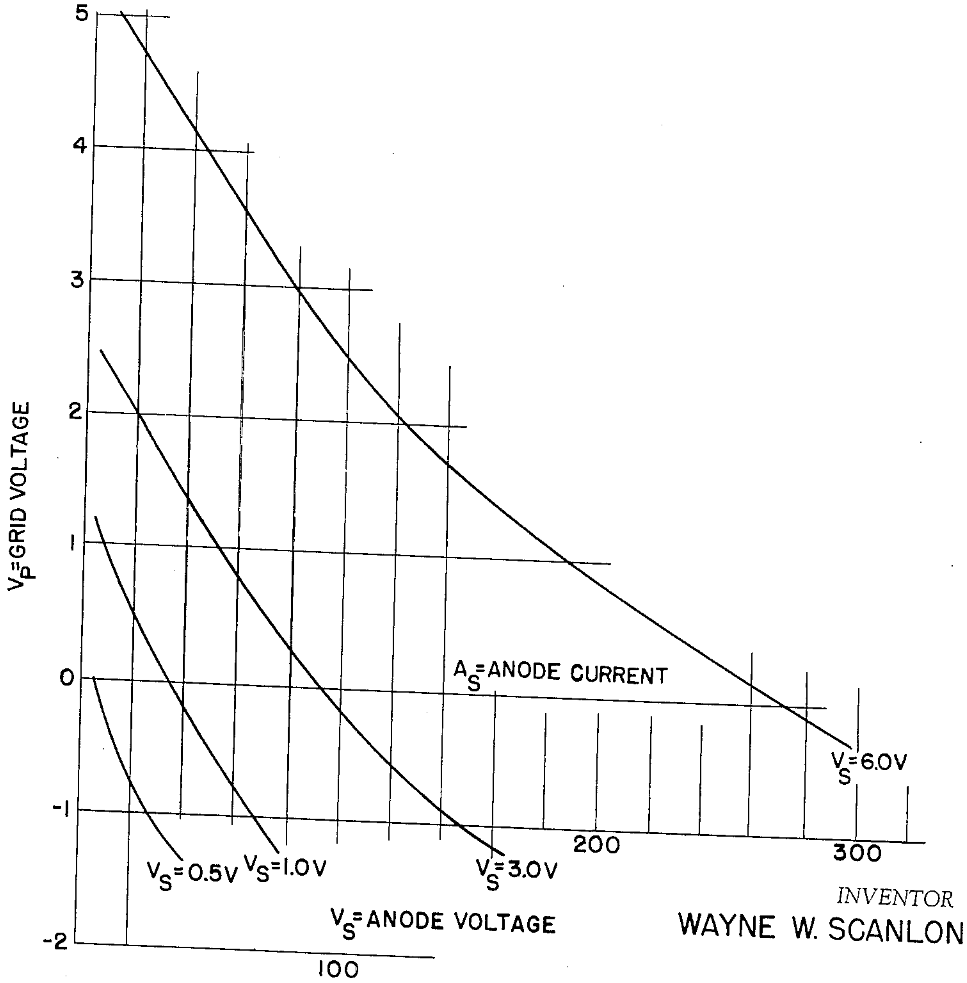
Fig. 7 is a graph plotted from results obtained with the circuit of Fig. 6 and indicating the variations in the secondary current with variations in the primary voltage for a series of fixed secondary voltages.

Lead 21 is connected through a battery 32, variable resistance 33 and ammeter 34 to the lead 22. A voltmeter 35 indicates the potential applied in the secondary circuit. The graph of Fig. 7 indicates the current obtained in the secondary circuit at various fixed values of $V_s$ when $V_p$ is varied in both the positive and negative directions. The connections illustrated in Fig. 6 produce the lower portion of the curves in Fig. 7 which lie below the horizontal zero coordinate. These curves merely illustrate the values obtained for one particular construction and might vary substantially for various modifications of the triode illustrated, but serve to confirm the characteristics that might be expected from such an arrangement. Similar triodes could be utilized in suitable circuits for amplification stages, oscillators and other uses analogous to those obtained with vacuum tube triodes.

It will be appreciated that articles and the method of the present invention are characterized by simplicity, a rugged construction and improved operating characteristics. Furthermore it will be apparent that the method described herein obviates the pre-treatment of the germanium material as well as prior requirements for careful positioning and attachment of the point contact entailed in prior methods and will thus expedite the manufacture and reduce the manufacturing cost of germanium rectifiers and other circuit elements of multiple contact varieties formed of germanium.

Obviously many modifications and variations of the present invention are possible in the light of the above teachings. It is therefore understood that within the scope of the appended claims the invention may be practiced otherwise than as specifically described.

What is claimed as new and desired to be secured by Letters Patent of the United States of America is:

1. A rectifier comprising a germanium wafer, a layer of tin fused to one face of the wafer and a layer of indium fused to the opposite face thereof.

2. A circuit element comprising a wafer of germanium, tin solder applied to one surface of said germanium wafer to provide one contact thereof, indium solder applied to the opposite surface of said germanium wafer to provide a second electrical conducting contact thereof.

3. A circuit element comprising a wafer of germanium, tin solder fused to one surface of said germanium wafer, and indium solder fused to separate areas of said germanium wafer.

4. A circuit element comprising a wafer of germanium, tin solder applied to one surface of said germanium wafer, a conducting lead secured to said tin solder, indium solder applied to the opposite surface of said germanium wafer, and at least one metallic lead of conducting material secured to said indium solder.

5. A rectifier comprising a germanium wafer having a conducting plate of larger area secured to one face thereof with tin solder, and a conducting lead secured to the opposite face thereof with indium solder, said tin solder being diffused into the adjacent portion of said germanium wafer to produce an N-type germanium, and said indium solder being diffused into the opposite portion of said germanium wafer to produce a P-type germanium.

6. A rectifier comprising a germanium wafer having a metallic lead soldered to one face thereof with tin and a second metallic lead soldered to the opposite face thereof with indium, said tin being diffused into the adjacent portion of said germanium wafer to produce an N-type germanium, and said indium being diffused into the opposite portion of said germanium wafer to produce a P-type germanium.

7. A rectifier comprising a germanium wafer having a tin soldered electrode area on one face thereof and an electrode area on the opposite face thereof formed with indium solder, said tin being diffused into a portion of said germanium wafer to produce an N-type germanium and said indium solder being diffused into a portion of the opposite face of said germanium wafer to produce a P-type germanium.

References Cited in the file of this patent

UNITED STATES PATENTS

| | | |
|---|---|---|
| 2,380,880 | Thompson et al. | July 31, 1945 |
| 2,496,432 | Blackburn | Feb. 7, 1950 |
| 2,514,879 | Horovitz et al. | July 11, 1950 |
| 2,561,411 | Pfann | July 24, 1951 |
| 2,603,693 | Kircher | July 15, 1952 |
| 2,644,852 | Dunlap | July 7, 1953 |